United States Patent
Karimi-Moghaddam et al.

(10) Patent No.: US 10,344,816 B2
(45) Date of Patent: Jul. 9, 2019

(54) PRESSURE PLATE WITH PHASE CHANGE MATERIAL

(71) Applicant: ABB Technology Ltd., Zurich (CH)

(72) Inventors: Giti Karimi-Moghaddam, Apex, NC (US); Daniel Kearney, Zurich (CH); Qimin Dong, Greer, SC (US); Galen Burdeshaw, Simpsonville, SC (US)

(73) Assignee: ABB Schweiz AG, Baden (CH)

( * ) Notice: Subject to any disclaimer, the term of this patent is extended or adjusted under 35 U.S.C. 154(b) by 522 days.

(21) Appl. No.: 15/041,557

(22) Filed: Feb. 11, 2016

(65) Prior Publication Data

US 2017/0234389 A1    Aug. 17, 2017

(51) Int. Cl.
| | |
|---|---|
| *F16D 13/64* | (2006.01) |
| *F16D 69/02* | (2006.01) |
| *F16D 65/78* | (2006.01) |
| *F16D 7/02* | (2006.01) |
| *F16D 69/00* | (2006.01) |

(52) U.S. Cl.
CPC ............. *F16D 69/02* (2013.01); *F16D 7/025* (2013.01); *F16D 13/648* (2013.01); *F16D 2065/781* (2013.01); *F16D 2069/002* (2013.01); *F16D 2200/0004* (2013.01); *F16D 2200/006* (2013.01); *F16D 2200/0034* (2013.01); *F16D 2200/0039* (2013.01); *F16D 2200/0056* (2013.01); *F16D 2300/0212* (2013.01)

(58) Field of Classification Search
CPC .................. F16D 13/70–757; F16D 2065/781
See application file for complete search history.

(56) References Cited

U.S. PATENT DOCUMENTS

| | | | | |
|---|---|---|---|---|
| 3,724,613 | A * | 4/1973 | Bermingham ........ | F16D 65/126 188/218 XL |
| 3,917,043 | A * | 11/1975 | Bok ....................... | F16D 13/64 188/218 XL |
| 3,932,568 | A * | 1/1976 | Watts .................... | C04B 35/532 106/36 |
| 5,139,118 | A * | 8/1992 | Schenk ................. | F16D 65/128 188/218 A |

(Continued)

FOREIGN PATENT DOCUMENTS

| | | | |
|---|---|---|---|
| DE | 3439779 A1 * | 4/1986 | ........... F16D 65/128 |
| EP | 2568792 A1 | 3/2013 | |
| WO | 2007075130 A1 | 7/2007 | |

OTHER PUBLICATIONS

Krishnan, Shankar, Suresh V. Garimella, and Sukhvinder S. Kang. "A novel hybrid heat sink using phase change materials for transient thermal management of electronics," Components and Packaging Technologies, IEEE Transactions on 28, No. 2 (2005): 281-289.

(Continued)

*Primary Examiner* — David R Morris
(74) *Attorney, Agent, or Firm* — J. Bruce Schelkopf; Taft Stettinius & Hollister LLP (57) ABSTRACT

A pressure plate for a friction coupling such as a clutch or brake system includes one or more pockets with a phase change material disposed therein. The phase change material operates to absorb and release heat when the friction coupling cycles between activation and deactivation so as to minimize a maximum temperature of the pressure plate.

19 Claims, 8 Drawing Sheets

(56) References Cited

U.S. PATENT DOCUMENTS

| | | | | |
|---|---|---|---|---|
| 5,613,578 | A | * | 3/1997 | Moseley .............. F16D 65/125 188/218 XL |
| 5,822,989 | A | | 10/1998 | Sturdevant et al. |
| 6,181,658 | B1 | | 1/2001 | Gordon |
| 6,528,132 | B1 | * | 3/2003 | Naerheim .............. F16D 65/12 188/264 D |
| 6,672,370 | B2 | | 1/2004 | Searls et al. |
| 7,069,979 | B2 | | 7/2006 | Tobias |
| 2002/0104641 | A1 | | 8/2002 | Searls et al. |
| 2002/0135263 | A1 | | 9/2002 | Neal |
| 2003/0145447 | A1 | * | 8/2003 | Moseley .............. C04B 35/83 29/458 |
| 2005/0258394 | A1 | | 11/2005 | Bacher et al. |
| 2017/0102043 | A1 | * | 4/2017 | Opalka .............. F16D 65/128 |

OTHER PUBLICATIONS

Schuffenhauer, Uwe, W. Urbański, N. Michalke, and H. Kuß. "Coding of electric machines by multi-phase systems." Maszyny Elektryczne: zeszyty problemowe 88 (2010): 97-102.

Zalba, Belén, José Ma Marín, Luisa F. Cabeza, and Harald Mehling. "Review on thermal energy storage with phase change: materials, heat transfer analysis and applications," Applied thermal engineering 23, No. 3 (2003): 251-283.

Sharma, Atul, V. V. Tyagi, C. R. Chen, and D. Buddhi. "Review on thermal energy storage with phase change materials and applications." Renewable and Sustainable energy reviews 13, No. 2 (2009): 318-345.

Silviu, Borozan Ion, Maniu Inocentiu, Argesanu Veronica, and Kulcsar Raul Miklos. "The energetic balance of the friction clutches used in automotive." In Proceedings of the 13th WSEAS international conference on Automatic control, modelling & simulation, pp. 252-256. World Scientific and Engineering Academy and Society (WSEAS), 2011.

Bellettre, J., V. Sartre, F. Biais, and A. Lallemand. "Transient state study of electric motor heating and phase change solid-liquid cooling." Applied Thermal Engineering 17, No. 1 (1997): 17-31.

* cited by examiner

PRESSURE PLATE WITH PHASE CHANGE MATERIAL

TECHNICAL FIELD

The present application generally relates to a friction coupling system and more particularly, but not exclusively, to a friction coupling with a pressure plate including phase change material for transient thermal management.

BACKGROUND

Friction coupling applications such as clutch or brake systems can generate a significant amount of heat during activation and deactivation. Excessive heat can lead to material wear and premature failure of certain components. Some existing systems have various shortcomings relative to certain applications. Accordingly, there remains a need for further contributions in this area of technology.

SUMMARY

One embodiment of the present invention is a unique friction coupling system. Other embodiments include apparatuses, systems, devices, hardware, methods, and combinations for compressor systems with a unique coupling system with a pressure plate having a phase change material for transient thermal management. Further embodiments, forms, features, aspects, benefits, and advantages of the present application shall become apparent from the description and figures provided herewith.

DETAILED DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
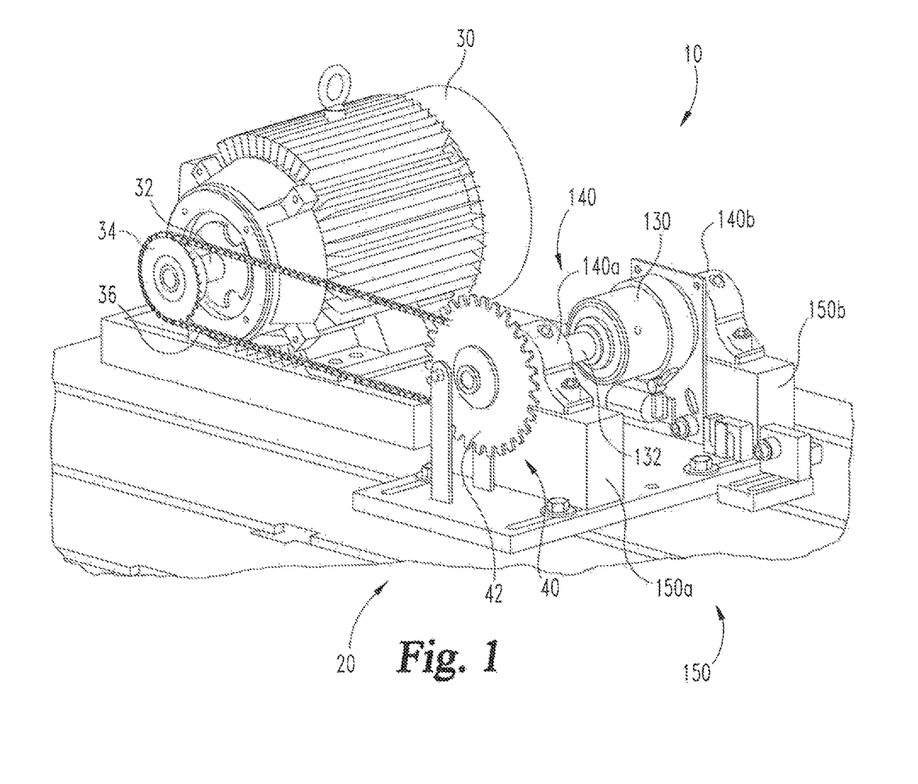
FIG. 1 is a perspective view of an apparatus with a friction coupling system according to one embodiment of the present disclosure.

Referring now to FIG. 1, an apparatus 10 illustrative of an exemplary embodiment of a friction coupling system is disclosed. One exemplary embodiment of a friction coupling system can include a clutch assembly. It should be understood that the illustrative apparatus is not limiting and other types of friction couplings such as those used in brake systems or the like may utilize the teachings herein. The illustrated clutch assembly according to one exemplary embodiment may be used with any apparatus for which a clutch may be desired. For example the clutch may be used in automotive applications, heavy industrial vehicle applications, aerospace applications, industrial machines, soft start mechanical clutch drives in mining conveyor and launching systems, and other applications as one skilled in the art would readily understand. In other forms a clutch system can be used in overload and protection devices for power transmission of rotating machinery. For example slip clutches that act as a fuse for overload protection.

In some friction coupling applications, the activation and deactivation duty cycle of the clutch may cause overheating of pressure plates and/or portions of rotatable components such as a gear due to friction caused by relative movement of the contact surfaces. Overheating can cause increased wear and premature failure of coupling components. The present application provides means for limiting a peak temperature of rotatable coupling components under certain duty cycles.

The exemplary apparatus 10 includes a base or support 20 for holding or supporting components of the apparatus 10. A motive source such as an electric motor 30 or the like can be used to provide power in certain embodiments. In alternate embodiments other motive sources such as internal combustion engines, turbine engines, fluid driven turbines or other motive sources may be utilized therewith. The electric motor 30 can include a rotatable motor shaft 32 operably connected to a motor sprocket 34 or the like. A drive mechanism such as a drive chain 36 may be connected between the motor sprocket and a gear (not shown in FIG. 1) associated with the clutch assembly 40. The drive chain 36 transmits a torque load from the electric motor 30 to the clutch assembly 40. In other forms, direct gear drive, belts or other load transfer means may be employed.

The clutch assembly 40 can include a clutch sprocket 42 or other output gear arrangement as would be known to those skilled in the art. The clutch assembly 40 may be connected to a controller (not shown) operable to control operation of the clutch assembly 40. A torque transducer 130 can be connected to the clutch assembly 40 through a transducer shaft 132 and to the controller such that input and output torque may be measured and controlled as desired. One or more bearing assemblies 140 such as a first bearing 140a and a second bearing 140b can be operably connected to the clutch assembly 40 and the torque transducer 130 to rotatably support each, respectively. In the exemplary embodiment the first bearing 140a is coupled to the clutch assembly 40 and the second bearing 140b is coupled to the torque transducer 130, however in other embodiments a single bearing set may be utilized or alternatively more than two bearings may be utilized. Each of the bearings 140a, 140b can be supported by mount structures 150 such as a first mount 150a and a second mount 150b, respectively as illustrated herein.

Figure 2:
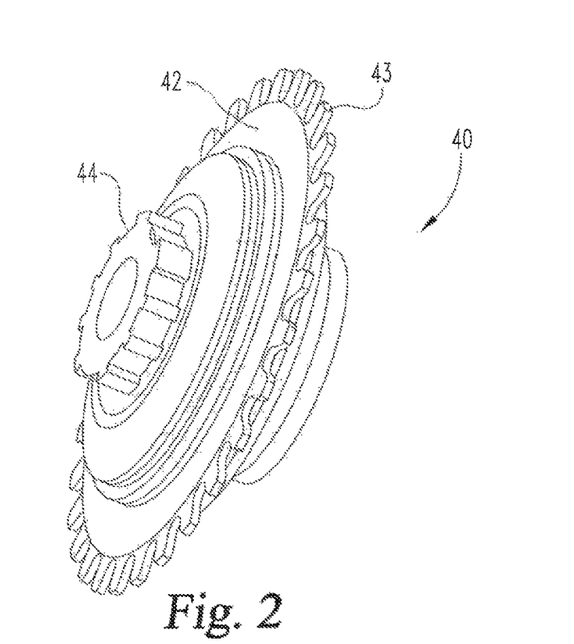
FIG. 2 is a perspective view of an exemplary clutch according to one embodiment of the present disclosure.
Figure 3:
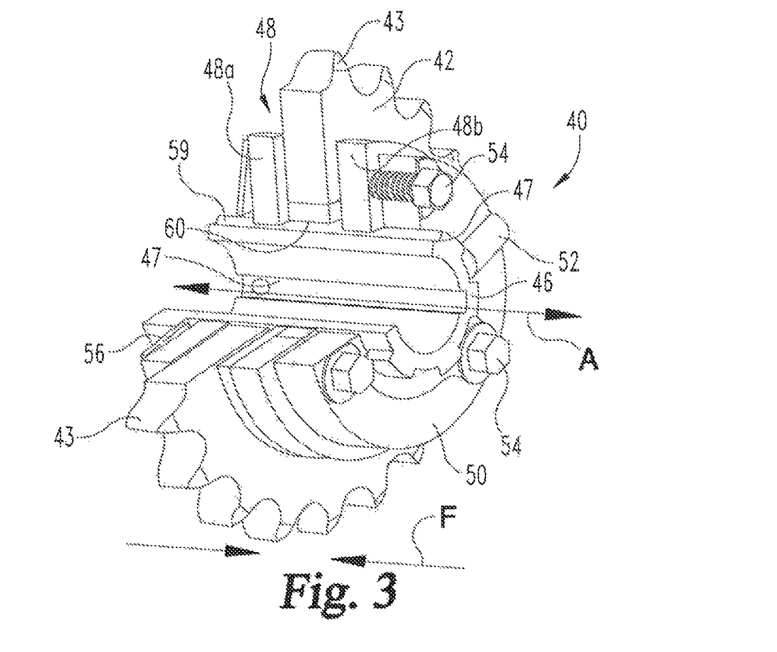
FIG. 3 is perspective cutaway view of the clutch of FIG. 2.

Referring now to FIGS. 2 and 3, a portion of the clutch assembly 40 is depicted in a perspective view and a cutaway perspective view respectively. The clutch assembly 40 can include a gear such as a sprocket gear 42 having a plurality of teeth 43 configured to drive an output load connected to the clutch as is known to one skilled in the art. An input gear 44 may be positioned so as to operably couple with a drive mechanism such as the drive chain 36 shown in FIG. 1. The clutch assembly 40 includes a spline hub 46 having at least one spline 47 extending along an inner wall and/or an outer wall of the hub 46 along an axial direction defined by axis A. The clutch assembly can include one or more movable pressure plates 48 and in the depicted embodiment includes a first pressure plate 48a and a second pressure plate 48b positioned on opposing sides of the sprocket gear 42. The splines 47 of the spline hub 46 can engage with mating features (not shown) of rotational components such as the pressure plates 48a, 48b to permit relative sliding movement along the direction defined by axis A while locking the pressure plates 48a, 48b relative to the spline hub 46 in a circumferential direction such that rotation of the spline hub 46 causes rotation of the pressure plates 48a, 48b. The clutch assembly 40 including the spline hub 46 will rotate when driven by the motive source 30.

Means for activating and deactivating the clutch assembly 40 can be of any form desired as one skilled in the art would readily understand. In one form as depicted herein, the activating/deactivating means can include a retainer housing 50 with actuation means (not shown) disposed therein. The actuation means can include active electronic, mechanical and/or hydraulic actuators operably connected to active or passive control means. By way of example and not limitation the retainer housing can include a set screw 52 or the like to operably lock the retainer housing 50 to the spline hub 46. An adjustment feature such as adjustment bolts 54 can threadingly engage with retainer housing 50 to adjust mechanisms (not shown) for engagement with a pressure plate 48a or 48b within the retainer housing. In one form the engagement mechanism can include one or more resilient members such as coil springs or the like. On the other side of the clutch assembly 40, a spring washer 56 may be positioned to engage the other of the pressure plates 48a or 48b. The adjustment features 54 and the spring washer 56 operate in complimentary fashion with the actuation means in the retainer housing 50 to control minimum and maximum pressure forces acting on the sprocket 42 by way of the pressure plates 48a, 48b. The actuation pressure force illustrated by the double arrow F wherein the pressure force will move the pressure plates toward one another in response to an actuation force in the clutch assembly 40.

The sprocket gear 42 can freely rotate about an outer surface 59 of the spline hub 46 when the pressure plates 48a and 48b are deactivated or otherwise not engaged with the sprocket gear 42 with enough force to provide a friction lock therebetween. A bearing 60 or bushing and the like can be positioned between the spline hub 46 and the sprocket gear 42. The bearing may be of a sleeve type or roller type to permit relative rotation while minimizing friction losses. In this manner, wear due to friction is reduced between the sprocket gear 42 and the spline hub 46.

When the actuator force is engaged or activated, the pressure plate 48a and 48b will move towards one another and engage the sprocket gear 42 such that after a threshold force is applied the pressure plate 48a and 48b will lockingly engage the sprocket gear 42 and cause the sprocket gear 42 to rotate in a non-slip condition. When the pressure force of the actuator is below the threshold force during activation or deactivation, the sprocket 42 may rotate in a slip engagement at a different speed than the pressure plates 48a, 48b. During slip engagement of the pressure plates 48a, 48b and the sprocket gear 42 heat generated due to friction is transferred into the pressure plates 48a, 48b. Over time high temperatures due to friction loading can cause undesirable wear and material deformation of the pressure plates 48a, 48b. If average and peak temperatures of the pressure plates can be reduced over a period of time where cyclic actuation and de-actuation occurs, wear and deformation of certain components including the pressure plates 48a, 48b can be reduced.

Referring now to FIGS. 4a through 4d, a plurality of exemplary pressure plates 48 are illustrated in various embodiments. It should be understood that other designs, shapes and configurations may be used in alternate embodiments of this disclosure. As stated previously, the pressure plate described herein is not limited to a clutch system as described in the present application and may be used with other types of friction coupling systems. Each of the pressure plates 48 can include a hub 72 that engages directly or indirectly with the spline hub 46 of the clutch assembly 40 (See FIG. 1) as shown in FIG. 3. In the embodiment shown in FIG. 4a a plurality of spokes or ribs 74 extends from the hub 72 to a rim 70 that defines an outer perimeter of the pressure plate 48. Although each of the pressure plates 48 illustrate a circular or round configuration as is typical in rotating applications, other configurations may be implemented if desired. The plurality of ribs 74 are shaped, sized and positioned relative to one another to define a pocket 76 therebetween. A back wall 78 formed between the hub 72 and the rim 70 of the pressure plate 48 defines a boundary on one side of each pocket 76.

Figure 4A:
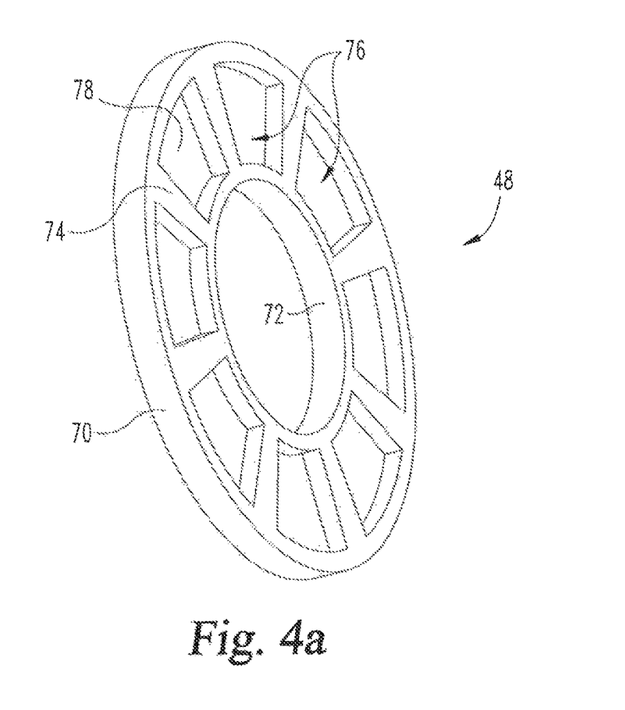
FIG. 4a is a perspective view of a portion of an exemplary pressure plate.
Figure 4B:
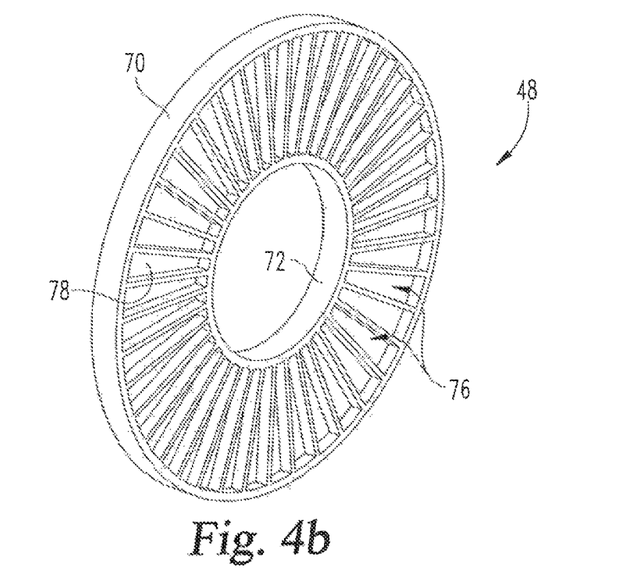
FIG. 4b is a perspective view of a portion of another exemplary pressure plate.
Figure 4C:
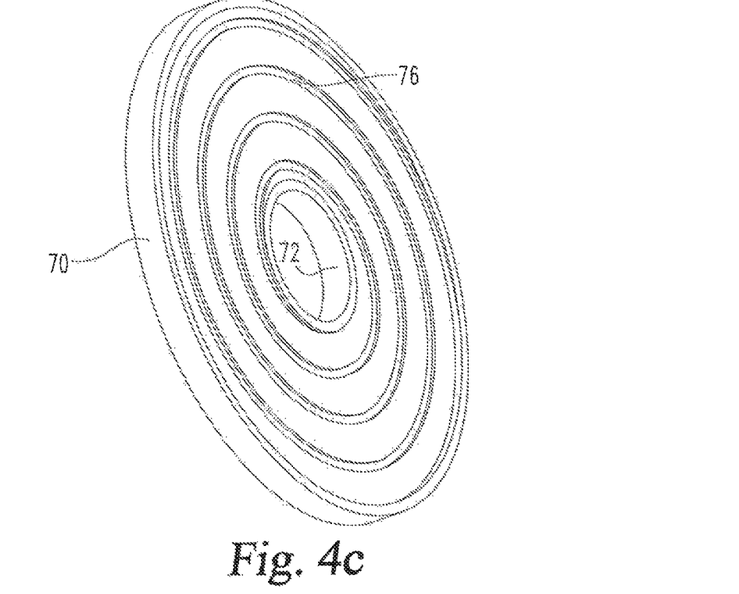
FIG. 4c is a perspective view of a portion of another exemplary pressure plate.
Figure 4D:
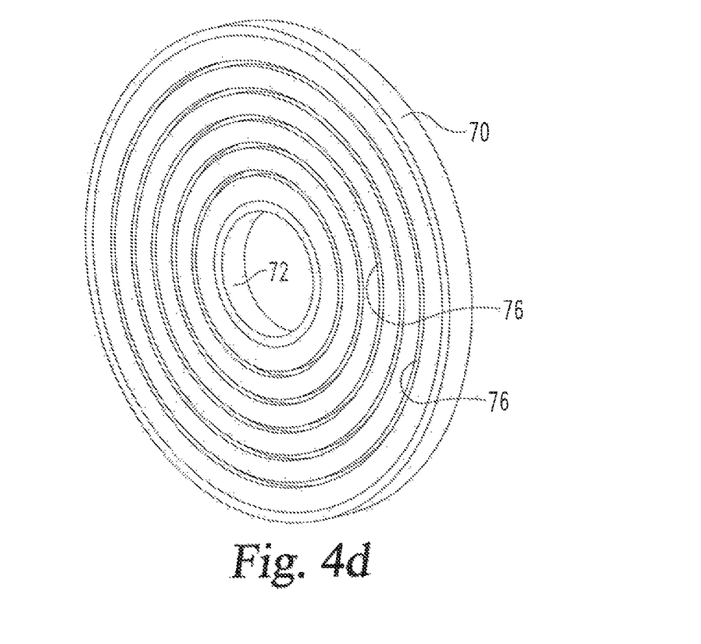
FIG. 4d is a perspective view of a portion of another exemplary pressure plate.

In some embodiments, the pockets 76 in a single pressure plate 48 can be formed in various shapes and sizes and thicknesses etc., relative to one another. It should also be understood that the pockets 76 defined in one pressure plate 48 may differ with another pressure plate in certain embodiments. For example, the pressure plates 48a and 48b may differ from one another in terms of size and shape including having variations in pocket configurations for a particular clutch assembly 40. As shown in FIG. 4a, the pockets 76 can be formed in a generally quadrilateral shape and may include curved sides. In FIG. 4b the pockets are formed as an elongate rectangular shape extending between the hub 72 and the rim 70. FIG. 4c illustrates an embodiment having a single spiral shaped pocket 76 initiating at the hub 72 and spiraling outward towards the rim 70. In other forms a spiral shape pocket 76 may include segmented portions that are intermittently positioned within the pressure plate 48. FIG. 4d illustrates a pocket 76 formed by a plurality of circular slots. In one form the circular slots 76 may be a plurality of concentrically configured slots about a central axis, in other forms the circular slots may not be positioned concentrically about a central axis. The pressure plates 48 and/or the gear 42 (See FIG. 3) may include a surface coating to enhance friction grip and/or wear properties of the rotating components that engage one another during a clutch actuation event.

Figure 5:
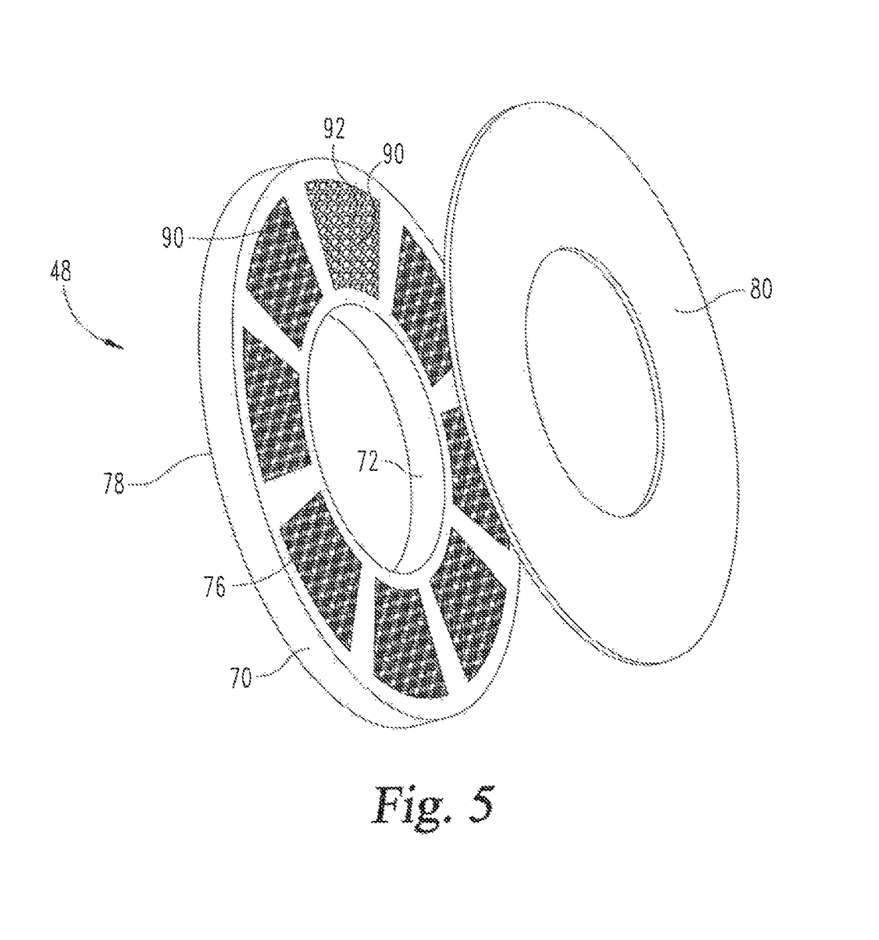
FIG. 5 is an exploded perspective view of a portion of an exemplary pressure plate with phase change material and a cover lid.

Referring now to FIG. 5, a pressure plate 48 may include a pressure plate cover or lid 80 configured to fixedly engaged with the rim 70 and the hub 72 of pressure plate 48 and cover the pockets 76 formed therewith. The lid 80 forms a boundary wall for each pocket 76 opposite of the back wall 78.

Each of the pockets 76 can be filled with a phase change material (PCM) 90. The pressure plate 48 and the lid 80 may be formed from one or more manufacturing techniques including, but not limited to castings, forgings, 3-D printing and the like. The lid 80 for the pressure plate 48 can be connected to the pressure plate 48 in any suitable manner as known to one skilled in the art such as for example, welding, brazing, threaded fasteners, friction fit or other mechanical fastening means.

PCM is configured to be a heat sink with a high heat of fusion and can be formed from a class of materials suitable for a desired temperature range. Heat is absorbed or released when the PCM changes from one phase to another. PCM will absorb heat without significant rise in temperature until the phase change is complete. The PCM material can include paraffin waxes, microcrystalline waxes and/or polyethylene waxes or other types as would be known to one skilled in the art. In one form the PCM includes materials with solidification temperatures between −5 degrees and 190 degrees Celsius. However in other forms the PCM may solidify at temperatures lower than −5 degrees or at temperatures higher than 190 degrees Celsius. In one form the PCM includes material that has a volume change of approximately 8 percent or less during solid/liquid phase transition. In other forms the volume change may be greater than 8 percent during solid/liquid phase transition. In some forms the PCM may include materials that have a solid to solid phase change wherein the crystalline structure is altered, but with no volume change during the phase change.

In some embodiments a thermally conductive material (TCM) 92 may be positioned within the pockets 76 in addition to a PCM 90. By way of example and not limitation, the TCM 92 can include a foam material, a wire mesh material, powder material, filler material or particle material. Foam is a cellular structure consisting of a solid material such as a metal as well as a large volume fraction of gas-filled pores. The pores can be sealed (closed-cell), or they can form an interconnected network (open-cell foam). The foam can include a very high porosity such that 75-95% of the volume is formed of void spaces. Material selection for the TCM whether in the form of foam or otherwise can include metals, graphites, ceramics, composites and combinations thereof. By way of example and not limitation a conductive filler material can include aluminum oxide, artificial diamond, metal, and boron nitride. In some forms the pockets 76 can be entirely filled with PCM 90, in other forms pockets 76 can include a mixture of PCM 90 and TCM 92. The lid 80 for the pressure plate 48 can enclose the pocket(s) 76 so as to prevent PCM 90 and/or TCM 92 from being discharged from the pocket(s) 76.

Figure 6A:
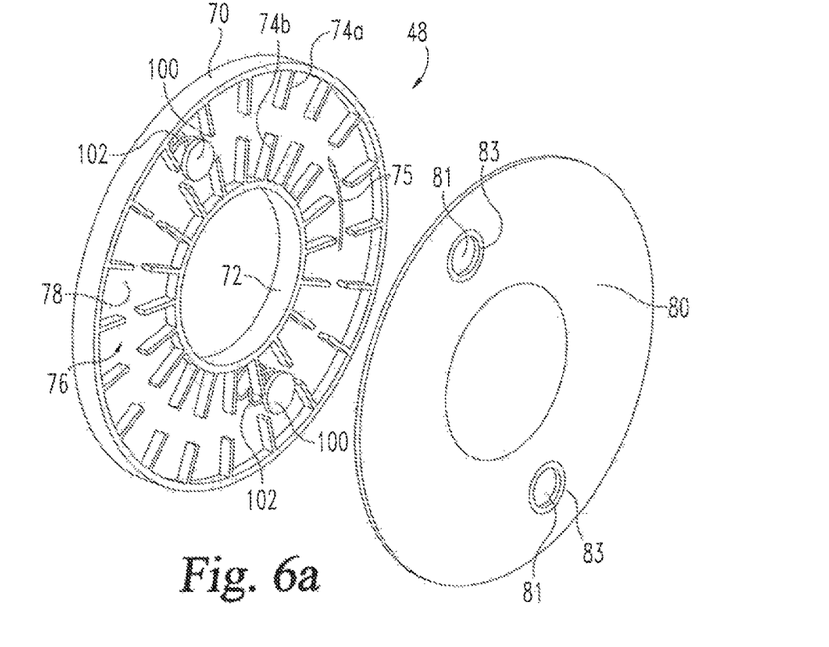
FIGS. 6a and 6b are exploded perspective views of a portion of other exemplary pressure plates with expansion plugs.

Referring now to FIG. 6a, an alternate form of the pressure plate 48 is depicted therein. The pressure plate 48 can include a plurality of outer ribs or spokes 74a and a plurality of inner ribs or spokes 74b. The outer spokes 74a can extend radially inward from the rim 70 and the inner spoke 74b can extend radially outward from the hub 72. In one form an equal number of outer spokes 74a and an equal number of inner spokes 74b may be formed with the pressure plate 48. In other forms an unequal number of inner and outer spokes 74b, 74a may be employed. In some embodiments a pathway 75 can be formed between the inner and outer spokes 74b, 74a so as to permit PCM (not shown in FIG. 6a) to move or flow between the spokes (74a, 74b) within the pressure plate 48 when the PCM is in liquid form.

In one embodiment, variable geometry features such as one or more expansion plugs 100 can be operably coupled to the pressure plate 48. The expansion plug 100 can be configured to permit expansion of PCM when the PCM is heated to a melting temperature. When the PCM expands during transition from solid to liquid form or gaseous form, the expansion plug will be forced outward and thus create additional volume within the enclosed pressure plate 48. In this manner the mechanical failure of the pressure plate due to hydraulic forces driven by increasing volume of the transforming PCM is prevented. The size, shape and number of expansion plugs can vary depending on the configuration of the internal features of the pressure plate 48, the size or volume of the pressure plate 48 and the type of PCM utilized with the pressure plate. In one form the expansion plug 100 can be coupled to a resilient member 102. The resilient member 102 operates to provide a reaction force to act against the expansion force of the PCM such that as the PCM changes volume during a phase change, the internal volume of the pressure plate 48 can increase or decrease in similar fashion. In one form the resilient member 102 can be a coil spring or the like that is connected to a wall of the pressure plate 48. In alternate forms the resilient member may be connected with the expansion plug 100 in integral or non-integral form. For example, in alternate embodiments, expansion bellows having nonporous or sealed portions, expansion plates and/or diaphragms made from flexible material or the like may be used as one skilled in the art would understand. In some forms the resilient member 102 can be connected to the back plate 78 of the pressure plate 48. In other forms the resilient member 102 can be connected to the lid 80, the hub 72 or the rim 70 depending on where the expansion plug is located.

Figure 6B:
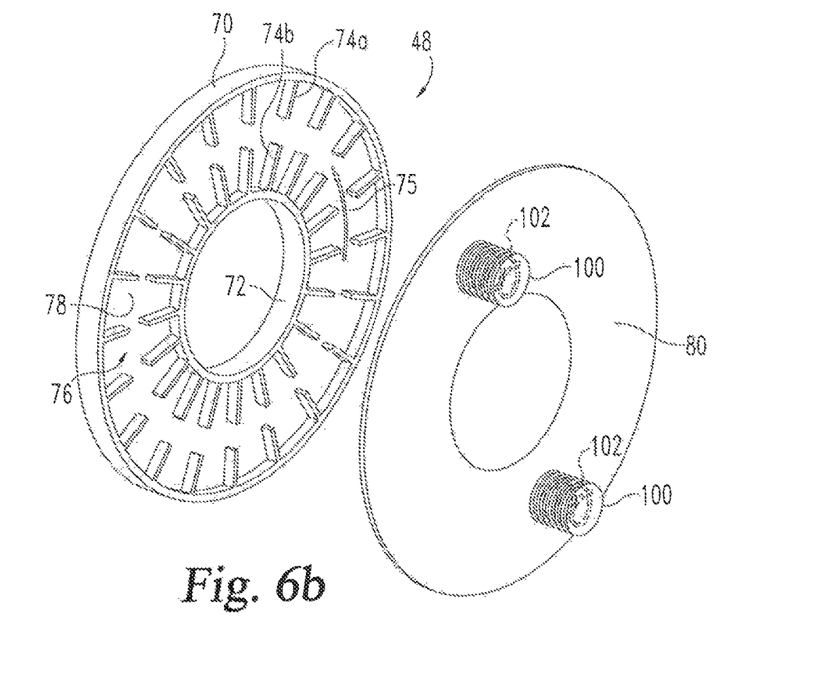

The location of the one or more expansion plugs or other variable geometry features is not limited other than to ensure that the expansion plugs do not interfere with other components within the clutch assembly 40 or other friction coupling system during operation. In the depicted embodiment, the exemplary lid 80 includes through apertures 81 sized to match corresponding expansion plugs 100. The expansion plugs 100 can freely move in an axial direction through the apertures 81 as the PCM expands and contracts during transformation between solid and liquid states as the clutch cycles during operation. In some forms a seal 83 can be inserted between the apertures 81 and the expansion plugs 100. In one form the seals 83 can be connected with the lid 80 adjacent an outer perimeter of the apertures 83 prior to installation of the lid 80. Alternatively, a seal 83 may be formed or connected with the expansion plugs. In either form each seal 83 operates to prevent PCM from leaking or otherwise escaping between the interface of the expansion plugs 100 and the apertures 81. FIG. 6b is an alternate configuration to that illustrated in FIG. 6a, wherein the variable geometry is in the form of an expansion bellows plug 100 in sealed connection with the lid 80. The expansion bellows plug 100 is operable for moving inward or outward as phase change material contracts or expands, respectively. In some forms the expansion plug 100 may also include a separate resilient member 102 connected thereto to urge the plug in a desired direction. In the exemplary depicted embodiment the resilient member 102 will urge the expansion plug 100 inward so that when the PCM is in solid form the expansion plug will move inward toward the pressure plate 48. In some forms, the expansion plug 100 in the form of an expansion bellows may be operable without a separate resilient member 102. Other forms of variable geometry expansion devices connected to the lid 80 or other portions of the pressure plate 48 are also contemplated by the present disclosure and should not be limited by the exemplary embodiments depicted herein.

Figure 7A:
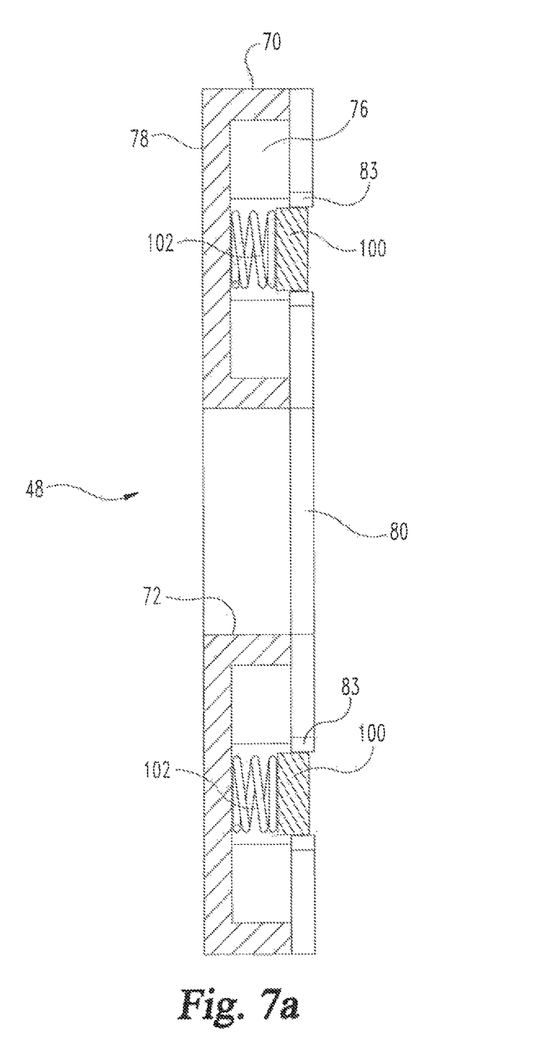
FIGS. 7a and 7b are cross-sectional views of the exemplary pressure plates and cover lids depicted in FIGS. 6a and 6b, respectfully.
Figure 7B:
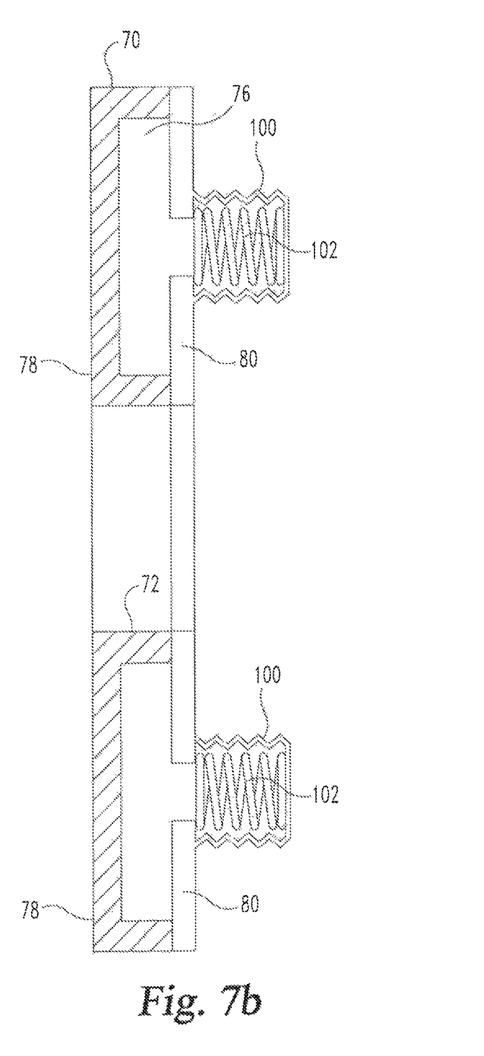

FIGS. 7a and 7b are cross-sectional views of FIGS. 6a and 6b with the pressure plates 48 and the lids 80 connected thereto, respectively.

Figure 8:
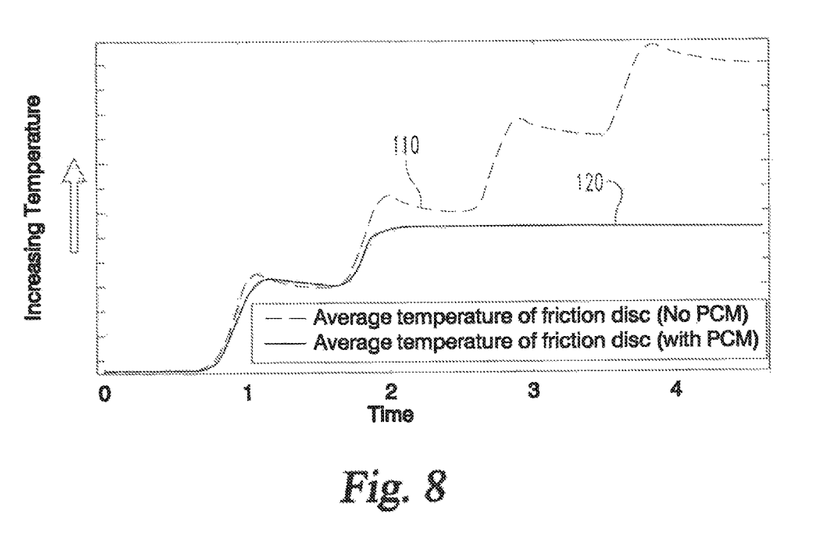
FIG. 8 is an exemplary graphical representation of temperature over time for friction coupling activation events with and without use of a phase change material.

Referring now to FIG. 8, an exemplary chart showing average temperature of a pressure plate versus time is illustrated. In this chart, a clutch actuation event occurs at each time step (e.g. 4 representative cycles). Plot line 110 illustrates increasing temperature over time of a standard pressure plate without phase change material. The temperature of the standard pressure plate stair climbs to increasing temperatures at each clutch actuation event or cycle event. Each cycle of engagement and disengagement of the pressure plate causes increase in the temperature in a step wise fashion. The temperature of the standard pressure plate increases after each of the four cycles.

Plot line 120 illustrates temperature of a PCM pressure plate versus time. The temperature of the PCM pressure plate stair climbs to increasing temperatures at the first two clutch actuation events. After the first two actuation events, the temperature of the PCM pressure plate levels off due to heat adsorption of the PCM. The PCM will continue to absorb heat until the material is completely melted, gasified or otherwise changes phase in a solid to solid crystalline structure and can no longer store additional heat through thermodynamic phase change properties.

Material selection for the PCM can be determined by requirements of the friction coupling system application. In some embodiments it may be desirable that under normal operating conditions the pressure plates would include large enough volume of the selected PCM that total phase change from solid to liquid would not occur. Thereby the heat sink defined by the volume of PCM in the pressure plate would never be completely depleted. In other embodiments it may be desirable to design a system wherein the PCM completely melts at each actuation event. In yet other embodiments, the PCM may include solid to solid transformation i.e., with no volume change or solid to gas transformation.

In operation, when a coupling actuation event occurs, the friction between the pressure plate and a rotating component such as a gear or a brake rotor will generate heat. The heat will flow via conduction heat transfer from the interface between the pressure plate and rotatable components to other components within the system. The pressure plate with PCM will transfer heat into the PCM such that the temperature will initially rise and then remain substantially steady as the PCM changes from solid to liquid or solid/solid in some material structures. The pressure plate can continue to absorb heat until the PCM has completely transformed to a different crystalline structure. After the coupling event is completed and no longer generating heat the PCM will begin to discharge the heat to ambient and the PCM will transform back to the original crystalline structure phase. In this manner the pressure plates and rotatable assemblies with PCM will remain at a lower average and peak operating temperature relative to a similar system with no PCM heat sink capacity.

In one aspect the present disclosure includes a system comprising a motive source; a friction coupling for selectively receiving and transmitting power from the motive source; drive means connecting the motive source to the friction coupling; a pressure plate associated with the friction coupling; and a phase change material (PCM) disposed within the pressure plate.

In refined aspects the friction coupling includes a rotatable component positioned adjacent the pressure plate; the friction coupling includes a second pressure plate positioned adjacent the rotatable component opposite of the pressure plate; the pressure plate includes one or more pockets configured to hold PCM; the one or more pockets are defined by one or more ribs extending from a back wall between a hub and a perimeter of the pressure plate; the pressure plate further comprises an expansion plug to provide a variable space for the PCM to expand and contract during heating and cooling cycles respectively; the PCM includes paraffin waxes, microcrystalline waxes and/or polyethylene waxes; the PCM includes materials with solidification temperatures between −5 degrees and 190 degrees Celsius; the PCM includes a volume change of approximately 8 percent or less during phase transition; a thermally conductive material disposed with the PCM; the thermally conductive material includes a foam material formed from one or more metals, graphites, ceramics or composites and combinations thereof; actuation means for moving the pressure plate between activated and deactivated positions.

In another aspect, the present disclosure includes a clutch comprising a hub shaft having an outer wall and a region configured to engage with a connecting shaft; a gear rotatably coupled to the outer wall of the hub; a first pressure plate positioned on one side of the gear, one or more pockets formed within the pressure plate; and a phase change material disposed within the one or more pockets.

In refined aspects, the clutch further comprising a second pressure plate positioned adjacent the gear opposite of the first pressure plate; the PCM is made from a material that that includes one of solid/gas transformation, solid/liquid transformation or solid/solid transformation in the operating temperature range of the clutch.

In yet another aspect, the present disclosure includes a pressure plate for a coupling comprising an inner hub; an outer rim spaced radially outward from the inner hub; a first wall extending between a hub and an outer rim; at least one pocket formed between the hub and the rim; a second wall engaged with the outer rim and hub opposite the first wall; and PCM disposed within the pocket.

In refined aspects, the pocket is defined by one of a plurality of concentric slots, a spiral slot, or a plurality of volumetric spaces defined by ribs positioned within the pressure plate; a thermal conductive material disposed in one or more of the pockets; the thermal conducive material includes a foam construction; the thermal conducive material includes one or more combinations of metals, graphites, ceramics and composites; the PCM is made from a material that that includes one of solid/gas phase transformation, solid/liquid phase transformation or solid/solid phase transformation in the operating temperature range of pressure plate; an expansion plug to provide a variable space for the PCM to expand and contract during heating and cooling cycles respectively; the PCM includes paraffin waxes, microcrystalline waxes and/or polyethylene waxes; the PCM includes materials with solidification temperatures between −5 degrees and 190 degrees Celsius; the PCM includes a volume change of approximately 8 percent or less during phase transition.

In yet another aspect, the present disclosure includes a method comprising forming a pressure plate with at least one internal pocket in association with a friction coupling; dispensing PCM within the internal pocket; transferring heat into the PCM during an actuation event of the friction coupling; and transferring heat from the PCM after the actuation event.

In refined aspects, the method further comprises moving a variable geometry feature of the pressure plate in response to thermal expansion and contraction of the PCM during operation of the friction coupling; placing a thermally conductive material within the at least one pocket; the thermally conductive material includes a foam construction.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A pressure plate for a coupling comprising:
   an inner hub;
   an outer rim spaced radially outward from the inner hub;
   a first wall extending between the hub and the outer rim;
   at least one pocket formed between the hub and the rim;
   a second wall engaged with the outer rim and hub opposite the first wall;
   phase change material (PCM) disposed within the pocket; and
   wherein the PCM expands outwardly from the pressure plate into an expansion volume in response to transformation of the PCM.

2. The pressure plate of claim 1, wherein the pocket is defined by a plurality of volumetric spaces defined by ribs positioned within the pressure plate.

3. The pressure plate of claim 1 further comprising a thermal conductive material disposed in one or more of the pockets.

4. The pressure plate of claim 3, wherein the thermal conductive material includes a foam construction.

5. The pressure plate of claim 3, wherein the thermal conductive material includes one or more combinations of metals, graphites, ceramics and composites.

6. The pressure plate of claim 1, wherein the PCM is made from a material that that includes one of solid/gas phase transformation, solid/liquid phase transformation or solid/solid phase transformation in the operating temperature range of the pressure plate.

7. The pressure plate of claim 1 wherein the expansion volume is formed by an expansion plug that extends outwardly from one of the first and second walls to provide a variable space for the PCM to expand and contract during heating and cooling cycles respectively.

8. The system of claim 1, wherein the PCM includes paraffin waxes, microcrystalline waxes and/or polyethylene waxes.

9. The system of claim 1, wherein the PCM includes materials with solidification temperatures between −5 degrees and 190 degrees Celsius.

10. The system of claim 1, wherein the PCM includes a volume change of approximately 8 percent or less during phase transition.

11. The pressure plate of claim 1, wherein the pocket is defined by a spiral slot defined by ribs positioned within the pressure plate.

12. The pressure plate of claim 1, wherein the pocket is defined by a plurality of concentric slots defined by ribs positioned within the pressure plate.

13. The pressure plate of claim 1, wherein the expansion volume is formed by an expansion plug that is coupled to a resilient member that provides a reaction force against expansion of the PCM and normally urges the expansion plug inwardly toward the pressure plate.

14. The pressure plate of claim 13, wherein the resilient member includes a coil spring that is connected to one of the first and second walls of the pressure plate.

15. The pressure plate of claim 14, wherein resilient member includes an expansion bellows around the coil spring.

16. The pressure plate of claim 1 wherein the second wall includes an aperture that provides an opening to the expansion volume.

17. The pressure plate of claim 16, wherein the expansion volume is defined by an expansion plug that freely moves in an axial direction of the aperture as the PCM expands and retracts.

18. The pressure plate of claim 17, further comprising a seal in the aperture between the second wall and the expansion plug.

19. A pressure plate for a coupling comprising:
   an inner hub;
   an outer rim spaced radially outward from the inner hub;
   a first wall extending between the hub and the outer rim;
   at least one pocket formed between the hub and the rim;
   a second wall engaged with the outer rim and hub opposite the first wall; and
   phase change material (PCM) disposed within the pocket, wherein the pocket is defined by a plurality of concentric slots defined by ribs positioned within the pressure plate.

* * * * *